(12) United States Patent
Wood et al.

(10) Patent No.: US 6,623,562 B2
(45) Date of Patent: Sep. 23, 2003

(54) APPARATUS FOR FABRICATING PASTED ELECTRODES

(75) Inventors: Edward F. Wood, Metamora, MI (US); Eric Willison, Waterford, MI (US); Jeffrey Key, Orion, MI (US)

(73) Assignee: Ovonic Battery Company, Inc., Troy, MI (US)

( * ) Notice: Subject to any disclaimer, the term of this patent is extended or adjusted under 35 U.S.C. 154(b) by 0 days.

(21) Appl. No.: 10/045,326

(22) Filed: Nov. 7, 2001

(65) Prior Publication Data

US 2003/0084847 A1 May 8, 2003

(51) Int. Cl.[7] .............................................. B05C 11/00
(52) U.S. Cl. ....................... 118/683; 118/405
(58) Field of Search ................... 118/405, 419, 118/121, 683, 429, 413, 122, 123; 427/8, 434.2, 356, 435, 115

(56) References Cited

U.S. PATENT DOCUMENTS

| 3,350,248 | A | * | 10/1967 | Demarest, Jr. et al. |
| 3,840,384 | A | * | 10/1974 | Reade et al. |
| 4,130,676 | A | * | 12/1978 | Ichiyanagi |
| 4,518,633 | A | * | 5/1985 | Walling et al. |
| 4,530,851 | A | * | 7/1985 | Shannon et al. |
| 4,587,133 | A | * | 5/1986 | Shannon et al. |
| 5,558,716 | A | * | 9/1996 | Mitani et al. |

* cited by examiner

Primary Examiner—Brenda Adele Lamb
(74) Attorney, Agent, or Firm—Philip H. Schlazer; Marvin S. Siskind

(57) ABSTRACT

A slurry loading apparatus for automatically loading a slurry into a substrate. The apparatus includes a pasting head. The pasting head includes a cavity that fills with slurry creating a pressure that forces the slurry onto the surface of the substrate and into the voids of the substrate. The slurry loading apparatus may include a feedback control loop that controls the rate in which slurry is delivered to the pasting head.

4 Claims, 3 Drawing Sheets

APPARATUS FOR FABRICATING PASTED ELECTRODES

FIELD OF THE INVENTION

The present invention relates generally to the fabrication of pasted electrodes for electrochemical devices such as batteries and fuel cells. More specifically, it relates to an automated apparatus for rapidly and uniformly pasting a solid particulate slurry into a continuous web of a substrate material.

BACKGROUND OF THE INVENTION

In rechargeable electrochemical cells, weight and portability are important considerations. It is also advantageous for rechargeable cells to have long operating lives without the necessity of periodic maintenance. Rechargeable electrochemical cells are used in numerous consumer devices such as calculators, portable radios, and cellular phones. They are often configured into a sealed power pack that is designed as an integral part of a specific device. Rechargeable electrochemical cells can also be configured as larger "cell packs" or "battery packs".

Rechargeable electrochemical cells may be classified as "nonaqueous" cells or "aqueous" cells. An example of a nonaqueous electrochemical cell is a lithium-ion cell which uses intercalation compounds for both anode and cathode, and a liquid organic or polymer electrolyte. Aqueous electrochemical cells may be classified as either "acidic" or "alkaline". An example of an acidic electrochemical cell is a lead-acid cell which uses lead dioxide as the active material of the positive electrode and metallic lead, in a high-surface area porous structure, as the negative active material. Examples of alkaline electrochemical cells are nickel cadmium cells (Ni—Cd) and nickel-metal hydride cells (Ni-MH). Ni-MH cells use negative electrodes having a hydrogen absorbing alloy as the active material. The hydrogen absorbing alloy is capable of the reversible electrochemical storage of hydrogen. Ni-MH cells typically use a positive electrode having nickel hydroxide as the active material. The negative and positive electrodes are spaced apart in an alkaline electrolyte such as potassium hydroxide.

Upon application of an electrical potential across a Ni-MH cell, the hydrogen absorbing alloy active material of the negative electrode is charged by the electrochemical absorption of hydrogen and the electrochemical discharge of a hydroxyl ion, forming a metal hydride. This is shown in equation (1):

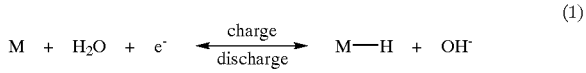

$$M + H_2O + e^- \underset{discharge}{\overset{charge}{\rightleftarrows}} M\text{—}H + OH^- \quad (1)$$

The negative electrode reactions are reversible. Upon discharge, the stored hydrogen is released from the metal hydride to form a water molecule and release an electron.

Hydrogen absorbing alloys called "Ovonic" alloys result from tailoring the local chemical order and local structural order by the incorporation of selected modifier elements into a host matrix. Disordered hydrogen absorbing alloys have a substantially increased density of catalytically active sites and storage sites compared to single or multi-phase crystalline materials. These additional sites are responsible for improved efficiency of electrochemical charging/discharging and an increase in electrical energy storage capacity. The nature and number of storage sites can even be designed independently of the catalytically active sites. More specifically, these alloys are tailored to allow bulk storage of the dissociated hydrogen atoms at bonding strengths within the range of reversibility suitable for use in secondary battery applications.

Some extremely efficient electrochemical hydrogen storage alloys were formulated, based on the disordered materials described above. These are the Ti—V—Zr—Ni type active materials such as disclosed in U.S. Pat. No. 4,551,400 ("the '400 patent") the disclosure of which is incorporated herein by reference. These materials reversibly form hydrides in order to store hydrogen. All the materials used in the '400 patent utilize a generic Ti—V—Ni composition, where at least Ti, V, and Ni are present and may be modified with Cr, Zr, and Al. The materials of the '400 patent are multiphase materials, which may contain, but are not limited to, one or more phases with $C_{14}$ and $C_{15}$ type crystal structures.

Other Ti—V—Zr—Ni alloys, also used for rechargeable hydrogen storage negative electrodes, are described in U.S. Pat. No. 4,728,586 ("the '586 patent"), the contents of which is incorporated herein by reference. The '586 patent describes a specific sub-class of Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other hydrogen absorbing alloy materials are discussed in U.S. Pat. Nos. 5,096,667, 5,135,589, 5,277,999, 5,238,756, 5,407,761, and 5,536,591, the contents of which are incorporated herein by reference.

The hydrogen storage alloy negative electrode may be paste type or non-paste type. Non-paste type electrodes are formed by pressing or compacting the active hydrogen absorbing alloy onto a conductive substrate. A method of fabricating non-paste types negative electrodes is disclosed in U.S. Pat. No. 4,820,481 ("the '481 patent") the disclosure of which is incorporated herein by reference. The present invention is directed to an apparatus for making paste type electrodes and, in particular, paste type hydrogen absorbing alloy electrodes.

SUMMARY OF THE INVENTION

Disclosed herein is an apparatus for pasting a slurry onto a substrate, comprising: a paster for loading the slurry onto the substrate to form a loaded substrate; a pump for delivering the slurry from a storage container to the paster; and a thickness sensor for measuring the thickness of the loaded substrate and forming a control signal corresponding to the thickness, the speed of the pump being responsive to the control signal.

Also disclosed herein is a paster for loading a slurry onto a substrate to form a loaded substrate, comprising: a cavity defined within the paster, a substrate inlet allowing the substrate to enter the cavity, at least one slurry inlet allowing the slurry to enter the cavity, the paster being adapted so that the slurry substantially fills the cavity, the substantially filled cavity creating a pressure forcing the slurry onto the substrate to form a loaded substrate.

DETAILED DESCRIPTION OF THE INVENTION

The present invention is directed to a pasting apparatus for automatically loading an active electrode slurry or paste onto a substrate material. Generally, the apparatus can be adapted for use with any type of substrate. That is, the substrate may be any electrically conductive support structure that can be used to hold the active electrode slurry. Examples of substrates include foam, grid, plate, foil, expanded metal or any other type of support structure. Typically, the substrate has a front surface, a back surface, and voids or openings between the front and back surface. For example, if the substrate is a wire mesh or screen, then the voids are the openings between the wires. Likewise, if the substrate is a perforated metal, then the voids are the perforations in the metal. Also, if the substrate is a foam material, then the voids are the pores within the foam material.

The actual form of the substrate used may depend on whether the substrate is used for the positive or the negative electrode as well as on the type of active material used. A substrate material which is commonly used for the positive electrode is a nickel foam. Common substrate materials used for the negative electrode include perforated metals, metal screens and expanded metals. The substrate is typically in the form of a continuous web.

Figure 1:
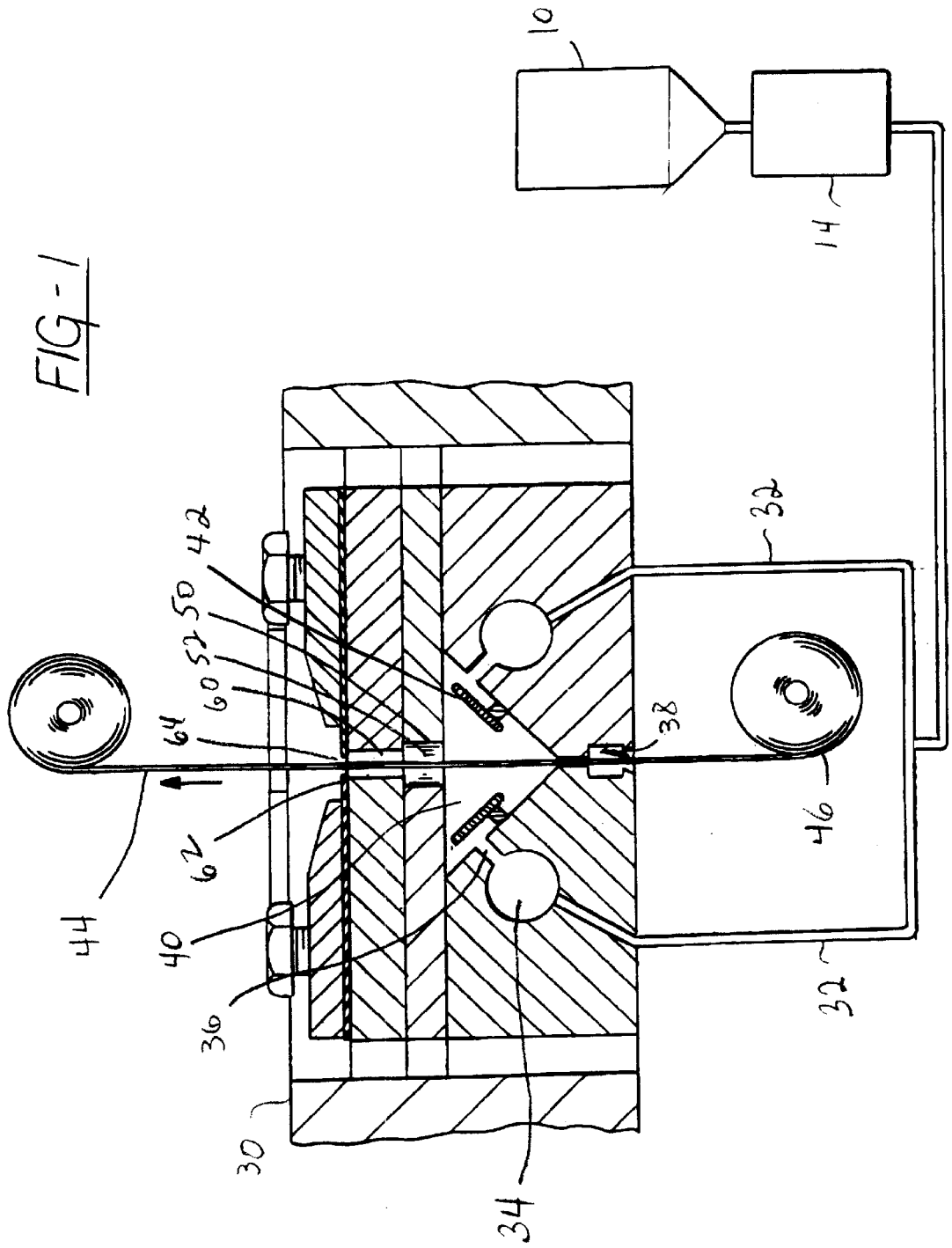
FIG. 1 is a schematic diagram of an embodiment of the pasting apparatus of the present invention.
Figure 2:
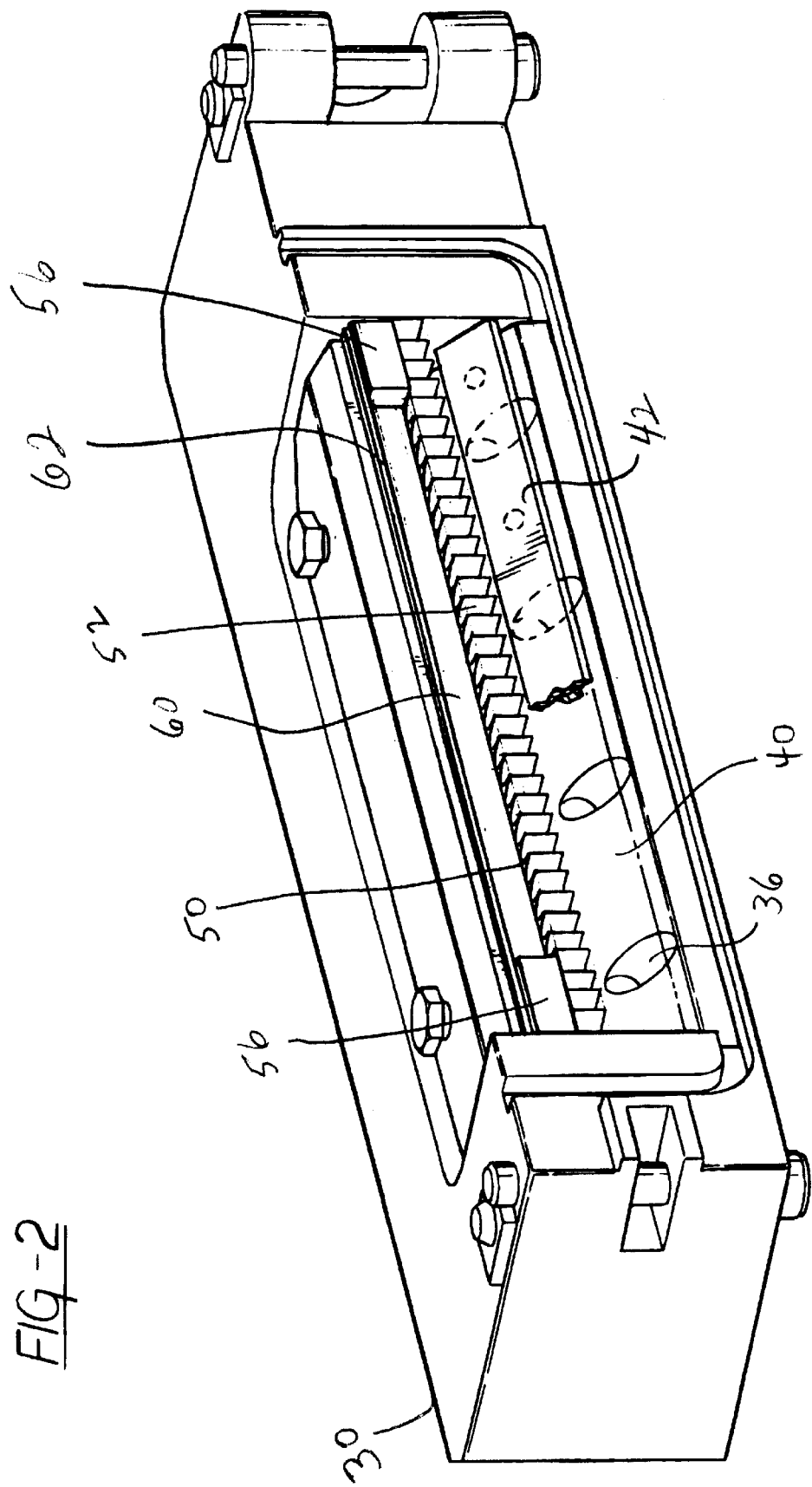
FIG. 2 is a cross-section three-dimensional view of an embodiment of the pasting head of the present invention.

An embodiment of the pasting apparatus of the present invention is shown in FIG. 1. Referring to FIG. 1, it is seen that the pasting apparatus includes a slurry tank 10 that is used to hold a supply of the active material slurry or paste composition. The active material slurry may have a non-uniform viscosity. A pump 14 (such as a parastalic pump) delivers the slurry from the slurry supply tank 10 to the two feed channels 34 of the pasting head 30 (also referred to as a "paster") by the dual delivery lines 32. Preferably, the pump 14 is a variable speed pump that can pump the slurry at different rates. A three-dimensional cross-section of the pasting head 30 is shown in FIG. 2.

Substrate 44 is preferably delivered to the pasting head 30 from the substrate web 46. The substrate enters the primary cavity 40 through a substrate inlet 38. In the diagram shown in FIG. 1, the substrate 44 moves from the bottom to top (as indicated by the arrow).

The slurry flows through the feed channels 34 and into both sides of the primary cavity 40 via the slurry inlets 36. Optional baffles 42 are positioned over (yet displaced from) the slurry inlets 36. As the slurry enters the primary cavity 40 through the slurry inlets 36 it flows around baffles 42. The baffles 42 thereby provide for a more uniform distribution of slurry into the primary cavity 40 as the slurry flows into the primary cavity 40 from the slurry inlets 36.

As the slurry enters the cavity from the slurry inlets 36, the slurry fills the cavity 40 and a backpressure is developed which forces the slurry onto both sides of the substrate 44. The slurry is forced into the voids of the substrate and forms a coating layer on both sides of the substrate.

Guides 50 (see FIG. 2) position the moving substrate 44 near the center of the primary cavity 40 so as to maintain even loading of the slurry from both sides. The guides 50 include clearance slots 52 (see FIG. 2). The clearance slots 52 allow a small portion of the slurry to pass through the guides 50 and follow the path of the moving substrate.

The pasting head 30 may further include wipers 56 which are capable of removing the slurry from the substrate where clear lanes are desired. The wipers 56 may be formed as rubber or plastic extrusions which gently apply pressure to the substrate to wipe away the slurry in order to form the clear lanes. The region between the two wipers 56, above the guide 50 and below the doctor blades 62 defines a small (optional) secondary cavity 60. Slurry passing through the clearance slots 52 that is not wiped away by the wipers 56 will follow the moving substrate and enter the secondary cavity 60. The build-up of excess slurry in the secondary cavity 60 builds pressure in the secondary cavity 60 between the doctor blade 62 (discussed below) and the guides 50. This pressure further presses the slurry into the substrate and tends to stabilize the viscosity variations in the slurry.

It is noted that the particular design of the pasting head 30 shown in FIG. 1 uses the pressure created by the build-up of slurry within the primary cavity 40 and the secondary cavity 60 to force the slurry onto both sides of the substrate and into the voids of the substrate.

The pasting head 30 may further includes doctor blades 62. The doctor blades 62 are spaced apart by a distance "D" to form a slot-type opening, referred to as an exit slot 64 through which the slurry-coated substrate may pass. As the loaded substrate passes between the doctor blades 62, the blades make contact with the slurry that coats both sides of the substrate, thereby scraping and dragging excess slurry off the substrate and forcing the excess slurry to remain in the secondary cavity 60 (further building pressure within the secondary cavity). The doctor blades thereby work to level the coated surfaces of the loaded substrate and provide a loaded substrate having a substantially uniform thickness. In fact, the thickness of the loaded substrate that passes through the exit slot 64 is controlled by the distance "D" between the doctor blades.

The doctor blades 62 may be formed of a very precision ground stainless steel. They preferably have a thickness of about 10 mil. The working edge that contacts the substrate may be ground to provide a precision cutting edge. The doctor blades preferably provide a high shear cutting of the slurry.

Hence, the loaded substrate that passes the doctor blades 62 has a substantially uniform thickness determined by the distance "D" between the doctor blades. However, it is still possible (even with the use of a doctor blade) that there are slight variations in the thickness of the loaded substrate. These variations may be due, at least in part, to variations in the speed in which the substrate moves through the pasting head and/or to variations in the viscosity of the slurry as the slurry is applied to the substrate in the primary cavity and/or secondary cavity.

Figure 3:
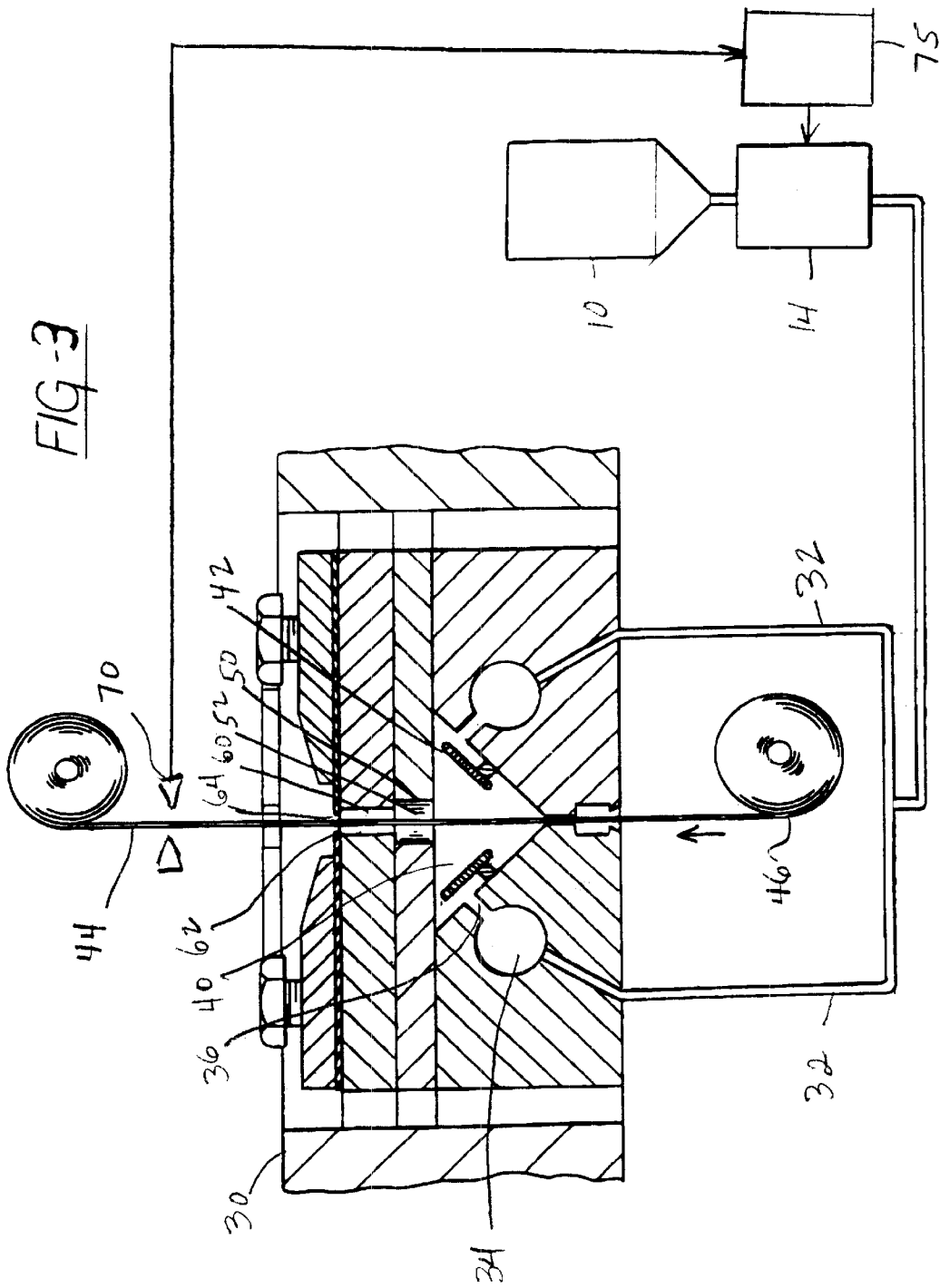
FIG. 3 is a schematic diagram of an embodiment of the pasting apparatus of the present invention that includes a feedback control loop.

In order to compensate for such variations, a "closed loop" control system may be added to the pasting apparatus to control the speed of the pump 10. This modified pasting apparatus is shown in FIG. 3. Referring to FIG. 3, after the loaded substrate passes the doctors blades, a thickness sensor 70 measures the thickness of the loaded substrate. The thickness sensor 70 sends a control signal back to a controller 75 which controls the speed of the pump 70 (the speed controller 75 may be built into the pump 14). Hence, if the thickness of the loaded substrate is too large, then the pump may be slowed so that slurry is delivered at a slower rate to the pasting chamber. Likewise, if the loaded substrate is too narrow, then the pump may be sped up so that slurry can be delivered to the pasting head 30 at a faster rate. The thickness sensor 70 may be any sensor known in the art that can measure the thickness of the loaded substrate. For example, it may be an optical sensor (such as a laser sensor). Alternately, the thickness sensor 70 may be an acoustical sensor or a mechanical sensor.

It is noted that the slurry used in the present invention is preferably a paste comprising a hydrogen storage alloy material. Such materials have been described above. The paste may be formed by mixing the hydrogen storage alloy material with a binder (such as a PVA binder). The substrate is preferably as metal screen or mesh.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. An apparatus for pasting a slurry onto a substrate, comprising:

a paster for loading said slurry onto said substrate to form a loaded substrate, said paster including an interior cavity, a substrate inlet allowing said substrate to enter said cavity and at least one slurry inlet allowing said slurry to enter said cavity, said paster being adapted so that said slurry substantially fills said cavity, said substantially filled cavity creating a pressure forcing said slurry onto said substrate within said cavity;

a pump for delivering said slurry from a storage container to said paster;

a thickness sensor for measuring the thickness of said loaded substrate and forming a control signal corresponding to said thickness;

a pump controller receiving said control signal from said thickness sensor and controlling the speed of said pump in response to said control signal.

2. The apparatus of claim 1, further comprising at least one doctor blade contacting said loaded substrate.

3. The apparatus of claim 1, wherein said at least one doctor blade is disposed outside said cavity.

4. The apparatus of claim 1, further comprising at least one baffle disposed within said cavity and spacedly disposed from said at least one slurry inlet.

* * * * *